Patented Nov. 26, 1946

2,411,567

UNITED STATES PATENT OFFICE 2,411,567

MANUFACTURE OF CARBOXYLIC ACID ANHYDRIDES

James Wotherspoon Fisher, Spondon, near Derby, England, assignor to British Celanese Limited, London, England, a company of Great Britain No Drawing. Application July 13, 1944, Serial No. 544,823. In Great Britain August 23, 1943

9 Claims. (Cl. 260—413)

This invention relates to the manufacture of anhydrides of carboxylic acids.

In one method of making anhydrides of carboxylic acids, which is useful in a great number of instances, the carboxylic acid is caused to react with acetic anhydride, whereby the carboxylic acid is dehydrated to its anhydride and the acetic anhydride is hydrated to acetic acid. The usual method of carrying out this reaction is to pass acetic anhydride vapour through the carboxylic acid at a temperature above the boiling point of acetic anhydride. For example stearic anhydride is made by passing acetic anhydride vapour through molten stearic acid.

The reaction may be represented for a monocarboxylic acid by the equation,

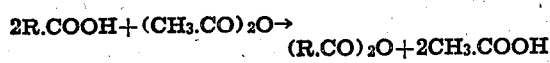

R being any suitable organic radicle. Thus in theory one molecular proportion of acetic anhydride should convert two molecular proportions of the carboxylic acid into the corresponding anhydride. In practice this is very far from being so, and it is found necessary to pass through the carboxylic acid an amount of acetic anhydride many times greater than the theoretical quantity if good yields of the anhydride are to be obtained. As an example, when making stearic anhydride the amount of acetic anhydride necessary for a substantially complete conversion of the stearic acid may be as high as fifty times the theoretical quantity. This is a serious drawback, for even if this acetic anhydride is for the most part recovered, its vapourisation requires the expenditure of a large amount of heat.

According to the present invention carboxylic acids are converted into their anhydrides by heating them with liquid acetic anhydride in the presence of an organic liquid which does not enter chemically into reaction with the carboxylic acid or its anhydride or with the acetic anhydride, and which forms with acetic acid a constant boiling mixture of minimum boiling point, and as the reaction proceeds removing the acetic acid produced thereby from the reaction zone by distilling it off as a constant boiling mixture. By this means it is possible to secure very good yields of the carboxylic acid anhydrides using much less acetic anhydride than has previously been required, for example less than 1.5 times the theoretical quantity.

The organic liquid (hereinafter referred to as the azeotroping agent) which is used to assist the reaction is preferably a solvent for the carboxylic acid; moreover the constant boiling mixture which it forms with acetic acid should contain a substantial proportion, for example at least 10% and preferably 20% or more, of acetic acid. Examples of suitable azeotroping agents are toluene, ethyl benzene and tetrachlorethylene.

In preparing carboxylic acid anhydrides by the process of the invention a mixture of the carboxylic acid, the azeotroping agent, and acetic anhydride may be heated to boiling in a reaction vessel under a fractionating column which is maintained at a temperature such that the constant boiling mixture of the azeotroping agent and acetic acid is distilled off while any acetic anhydride or carboxylic acid vapour that may also be present is condensed and returned to the reaction vessel. Heating may be continued until no more acetic acid is evolved, as indicated by a rise in the temperature at the top of the fractionating column above the boiling point of the constant boiling mixture. The remainder of the azeotroping agent may then be removed, preferably by distillation under reduced pressure, leaving the carboxylic acid anhydride in the reaction vessel. The acetic acid and azeotroping agent may subsequently be separated, for example by extracting the acetic acid with water, and the azeotroping agent dried and re-used.

The new process is of particular value in the manufacture of the anhydrides of saturated acids containing six or more carbon atoms in the acid molecule, including both straight chain compounds such for example as stearic acid, palmitic acid, and lauric acid, and branched chain compounds such for example as 2-ethylhexoic acid. It may however also be used to make the anhydrides of a great number of other carboxylic acids, including the anhydrides of other homologues of acetic acid, e. g. propionic and n-butyric anhydrides, anhydrides of aliphatic dibasic acids, e. g. succinic anhydride and ethyl succinic anhydride, and aromatic acid anhydrides, e. g. benzoic anhydride.

The invention is illustrated by the following examples.

Example 1

1360 parts by weight of commercial stearic acid were dissolved in 1730 parts of toluene (which had been dried by distilling off water as its constant boiling mixture with toluene) in a reaction vessel fitted with a fractionating column, and 302 parts of 95% acetic anhydride was added to the solution. The mixture was heated under atmospheric pressure to a temperature of about 120° C. At this temperature reaction takes place, and stearic anhydride and acetic acid are formed. The constant boiling mixture of acetic acid and toluene, boiling at about 105° C., was allowed to distil off, any vapourised acetic anhydride being condensed and returned to the reaction vessel. Towards the end of the reaction the temperature of the liquid in the reaction vessel began to rise, until when the reaction was substantially complete (as indicated by a rise in the temperature at the top of the fractionating column to the boiling point of toluene) it had reached 160° C. At this point the fractionating column was cut out and, while the temperature of the liquid was held at 160° C., the pressure was steadily reduced until substantially all the remaining toluene had been removed, a small current of air being passed through the liquid meanwhile. When all the toluene had been removed, there remained in the reaction vessel stearic anhydride of purity above 90%.

The distillate, comprising toluene and acetic acid, was extracted with a small quantity of water to remove the acetic acid; the toluene was dried by distilling off the first 2–3% of its bulk, and was then available for re-use.

The anhydrides of lauric acid and palmitic acids are made in a similar way, employing the same molecular proportions of the reactants.

*Example 2*

1000 parts by weight of 2-ethylhexoic acid were dissolved in 3700 parts of toluene, and 600 parts of acetic anhydride were added to the solution. The mixture was heated under a fractionating column, as described in Example 1, until the temperature of the liquid reached 150° C. The reaction was then substantially complete. The fractionating column was now cut out and the temperature of the liquid allowed to fall to 125° C., and maintained at this level while the remaining toluene was distilled off under increasingly low pressure. When substantially all the toluene had been removed, the residue contained 85–90% of 2-ethylhexoic anhydride.

Having described my invention, what I desire to secure by Letters Patent is:

1. Process for the manufacture of the anhydride of a carboxylic acid, which comprises heating a carboxylic acid with liquid acetic anhydride in the presence of an organic liquid which does not enter chemically into reaction with the carboxylic acid or its anhydride or the acetic anhydride and which forms with acetic acid a constant boiling mixture of minimum boiling point, and removing the acetic acid produced by the reaction from the reaction zone as the reaction proceeds by distilling it off as a constant boiling mixture.

2. Process for the manufacture of the anhydride of a saturated fatty acid containing at least six carbon atoms in the acid molecule, which comprises heating the fatty acid with liquid acetic anhydride in the presence of an organic liquid which does not enter chemically into reaction with the fatty acid or its anhydride or the acetic anhydride and which forms with acetic acid a constant boiling mixture of minimum boiling point, and removing the acetic acid produced by the reaction from the reaction zone as the reaction proceeds by distilling it off as a constant boiling mixture.

3. Process for the manufacture of the anhydride of a saturated fatty acid containing at least 6 carbon atoms in the acid molecule, which comprises heating the fatty acid with liquid acetic anhydride in the presence of an organic solvent for the fatty acid which does not enter chemically into reaction with the fatty acid or its anhydride and which forms with acetic acid a constant boiling mixture of minimum boiling point containing at least 20% of acetic acid, and removing the acetic acid produced from the reaction zone as the reaction proceeds by distilling it off as a constant boiling mixture with the organic solvent.

4. Process for the manufacture of stearic anhydride, which comprises heating stearic acid with liquid acetic anhydride in the presence of an organic solvent for stearic acid which does not enter chemically into reaction with stearic acid, stearic anhydride or acetic anhydride and which forms with acetic acid a constant boiling mixture of minimum boiling point, and removing the acetic acid produced by the reaction from the reaction zone as the reaction proceeds by distilling it off as a constant boiling mixture with the organic solvent.

5. Process for the manufacture of ethyl-hexoic anhydride, which comprises heating ethyl-hexoic acid with liquid acetic anhydride in the presence of an organic solvent for ethyl-hexoic acid which does not enter chemically into reaction with ethyl-hexoic acid, ethyl-hexoic anhydride or acetic anhydride and which forms with acetic acid a constant boiling mixture of minimum boiling point, and removing the acetic acid produced by the reaction from the reaction zone as the reaction proceeds by distilling it off as a constant boiling mixture with the organic solvent.

6. Process for the manufacture of lauric anhydride, which comprises heating lauric acid with liquid acetic anhydride in the presence of an organic solvent for lauric acid which does not enter chemically into reaction with lauric acid, lauric anhydride or acetic anhydride and which forms with acetic acid a constant boiling mixture of minimum boiling point, and removing the acetic acid produced by the reaction from the reaction zone as the reaction proceeds by distilling it off as a constant boiling mixture with the organic solvent.

7. Process for the manufacture of stearic anhydride which comprises heating to boiling a mixture of stearic acid, acetic anhydride and toluene, and removing the acetic acid produced by the reaction from the reaction zone as the reaction proceeds by distilling it off as a constant boiling mixture with the toluene.

8. Process for the manufacture of ethyl-hexoic anhydride which comprises heating to boiling a mixture of ethyl-hexoic acid, acetic anhydride and toluene, and removing the acetic acid produced by the reaction from the reaction zone as the reaction proceeds by distilling it off as a constant boiling mixture with the toluene.

9. Process for the manufacture of lauric anhydride which comprises heating to boiling a mixture of lauric acid, acetic anhydride and toluene, and removing the acetic acid produced by the reaction from the reaction zone as the reaction proceeds by distilling it off as a constant boiling mixture with the toluene.

JAMES WOTHERSPOON FISHER.